UNITED STATES PATENT OFFICE.

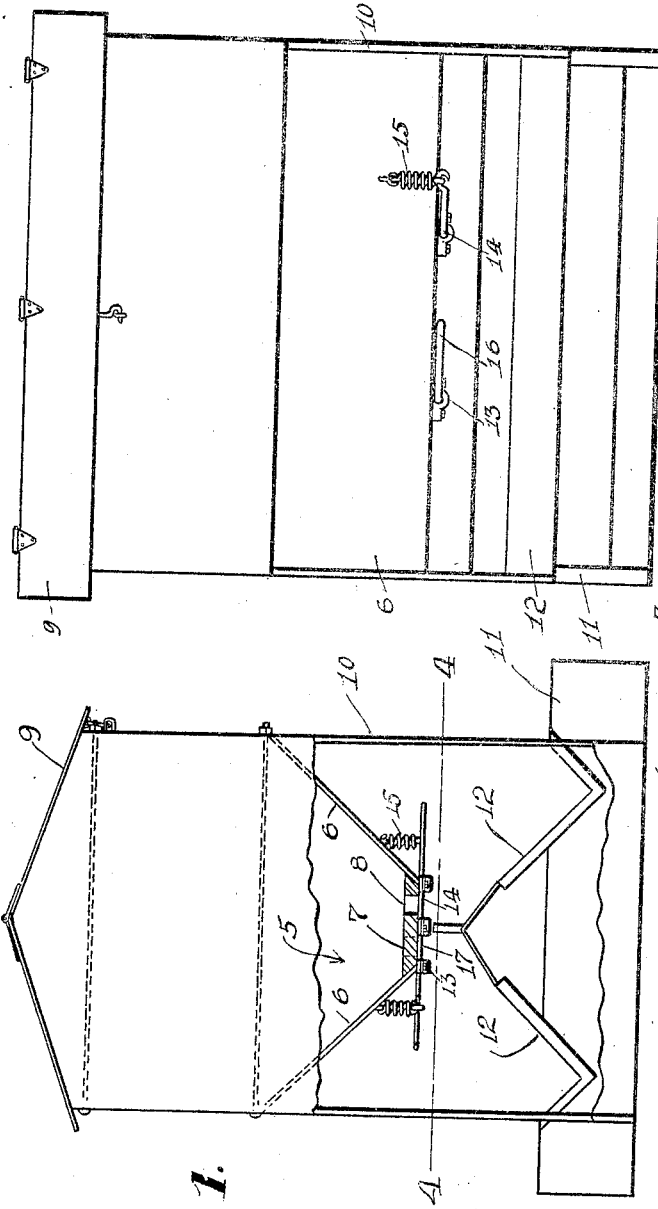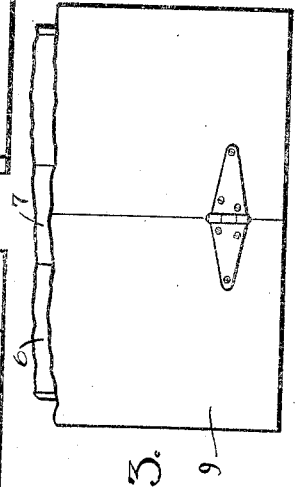

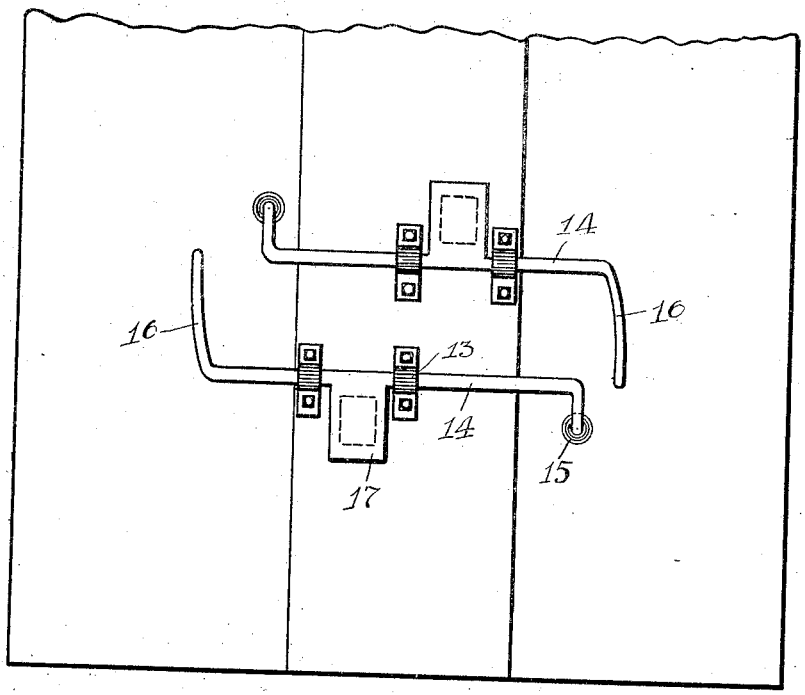
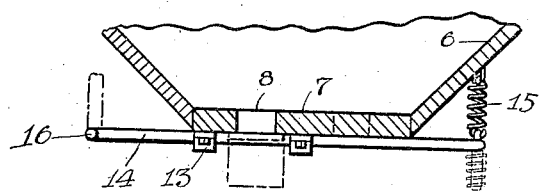

WILLIAM H. ABTS, OF BELDEN, NEBRASKA.

ANIMAL-CONTROLLED FEEDER.

1,375,622.   Specification of Letters Patent.   Patented Apr. 19, 1921.

Application filed August 8, 1919. Serial No. 316,106.

*To all whom it may concern:*

Be it known that I, WILLIAM H. ABTS, a citizen of the United States, residing at Belden, in the county of Cedar and State of Nebraska, have invented a new and useful Animal-Controlled Feeder, of which the following is a specification.

The present invention relates to hog or other animal feeders, the principal object being to provide an animal feeder which is operated by the animal to dispense the feed into the eating troughs.

A further important object of the invention resides in the provision of an animal feeder which includes a hopper for containing the feed such as grain, and eating troughs disposed below the hopper in such a manner as to be protected against the weather by the hopper, and an animal-operated valve which is disposed in such a manner as to be readily engaged and moved to an open position by the animal's snout.

Still another object of the invention is to provide an animal feeder which will retain the feed in a sanitary condition and which will dispense the same as it is consumed by the animals, thereby eliminating waste.

Another general object of the invention is to improve hog or other animal feeders and to generally enhance the utility and construction of devices of this character.

In the drawing:

Figure 1, is a view partly in vertical cross section and partly in end elevation of an animal feeder constructed in accordance with my invention;

Fig. 2, is a front elevation thereof;

Fig. 3, is a fragmentary top plan view of the feeder;

Fig. 4, is an enlarged fragmentary plan view of the hopper and valve construction; and Fig. 5, is a fragmentary detail view of the hopper and valve construction, the hopper being shown in vertical cross section.

Referring to the drawing wherein like characters of reference designate like parts in all the views the numeral 5 designates a hopper which is provided with oppositely inclined walls 6 supporting a bottom wall 7 having an outlet opening 8 therein. Doors 9 are hinged to the top of the hopper 5.

The hopper 5 is formed with parallel vertical end walls 10 the lower ends of which are secured to horizontally disposed rests or standards 11, extending beneath the hopper 5 and supported in the standards 11 are oppositely inclined feed troughs 12. A feed distributer plate which is of inverted V-shape in cross section is supported beneath the bottom so that its apex is disposed centrally between the longitudinal edges of the bottom, so that an equal amount of grain will be distributed to each of the feed troughs 12. Mounted on opposite sides of the outlet openings 8 upon the under face of the bottom are bearings 13 in which are rotatably mounted valve rods 14. One end of each of these valve rods is bent at right angles and connected to each of these ends is a coil spring 15 suspended from the inclined walls of the hopper. The opposite ends of these rods 14 are bent at right angles in the reverse direction and longitudinally curved to provide a snout engaging arm 16. Extending laterally from the valve rods are plate valves 17 which normally close the outlet openings in the bottom 7.

Normally the contractile springs 15 retain the valve rods 14 in positions where the valves 17 will close the outlet openings in the bottom 7. The hog or other animal will engage its snout against the arm 16 and push the same upwardly to rotate the valve rod, thus moving the valve 17 downwardly to permit the feed to pass through the outlet openings 8 to be discharged into the troughs 12.

The embodiment of the invention here illustrated and described is the preferred construction but it is to be understood that the same may be modified in many respects and that my limits of modifications are only governed by what is claimed.

What is claimed is:—

1. The combination with a hopper having an outlet in the bottom thereof, of a rod mounted for rotation on said bottom, a plate secured thereto and constituting a valve for closing the outlet, oppositely extending end portions of the rod projecting laterally from the axis of rotation of the rod, and a spring connected to one of said end portions for holding the plate or valve in closed position across the outlet, the other end of the rod constituting means to be lifted by the snout of an animal to open the valve.

2. A feed dispenser comprising a hopper having an outlet opening in the bottom thereof, bearings upon the outer face of the bottom, a valve, a valve rod rotatable in the bearings and having one end bent at right angles, the opposite end terminating in an oppositely extending and longitudinally curved snout engaging member adapted to be engaged by the animal's snout to rock the valve rod, and a coil spring having one end fixed to a member and its opposite end connected with the right angularly extending end to urge the latter to a position where the valve will close the outlet opening.

In testimony that I claim the foregoing as my own, I have hereto affixed my signature in the presence of two witnesses.

WILLIAM H. ABTS.

Witnesses:
E. M. Hayden,
Chas. B. Andrews.